United States Patent Office 2,890,116
Patented June 9, 1959

2,890,116
ESTROGENIC FACTOR

Emanuel M. Bickoff and Albert N. Booth, Berkeley, Calif., assignors to the United States of America as represented by the Secretary of Agriculture No Drawing. Application October 31, 1957
Serial No. 693,785

11 Claims. (Cl. 99—2)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is merely granted to the Government of the United States of America.

This invention relates in general to a new estrogenic factor and to utilization of this factor in animal raising. The objects of the invention include the provision of the novel estrogenic factor, methods of isolating it, animal feeds and other compositions containing the factor, and methods of producing and utilizing such compositions. Further objects and advantages of the invention will be evident from the following description.

It is well known in the field of animal husbandry that it is often desirable to provide animals with estrogenic preparations particularly for the purpose of increasing weight gain and increasing efficiency of feed utilization. Such effects can be attained by adding to the regular diet a minor proportion of diethylstilbestrol. Also, estrogenic agents such as diethylstilbestrol can be implanted subcutaneously in animals to attain the desired effects. Such procedure is employed generally with fowls.

We have isolated from plant material a hitherto unknown compound which displays estrogenic properties. Because of this activity the compound is useful in animal raising. That is, the new compound can be used in place of known estrogenic compounds, as in feeds or in subcutaneous implantation, to accomplish like results of accelerating weight gain and increasing efficiency of feed utilization.

The compound of the invention can be isolated by methods hereinafter described from any plant materials in which it is naturally present. Especially valuable sources of the compound are plants of the genera Trifolium and Medicago, for example, ladino clover (*Trifolium repens*), alfalfa (*Medicago sativa*), and strawberry clover (*Trifolium fragiferum*).

It has been previously demonstrated that many forage crops including alfalfa, various varieties of clover, grasses, etc, contain estrogenic activity. In most cases these observations were made by feeding animals the plant material; the active agents were not isolated or characterized. In the few cases in which estrogenic agents were isolated the compounds proved to be isoflavones. Thus formononetin (7-hydroxy-4'-methoxy isoflavone) and genistein (5, 7, 4'-trihydroxy isoflavone) have been isolated from subterranean clover and the latter compound was shown to be mainly responsible for the estrogenic activity in this plant (Bradbury, Jour. Chem. Soc. 1951, p. 3447). Also, biochanin A (5,7-dihydroxy-4'-methoxy isoflavone) has been isolated from red clover (Pope et al., Chem & Ind., 1953, p. 1092). As explained hereinafter, the compound of this invention is entirely distinct from these isoflavones as it is a coumarin derivative.

Although forage crops naturally contain estrogenic principles, and indeed ladino clover, alfalfa, etc. naturally contain the estrogenic compound of this invention, the forage crops as such are not suitable for providing the desired physiological effects which result in accelerated weight gain and increased feed efficiency. Any attempt to obtain such contemplated physiological responses by feeding the forage would result in complete failure, or at most haphazard, variable, and uncontrollable effects on the animals. Among the factors to be considered are the minute proportion of the estrogen in the forage crop, the high proportion of fiber, the variance in estrogen content, and the presence of growth inhibitors and saponins. Regarding the first item, the estrogenic compound of the invention is present in forage material in a very minute proportion, so that it is physically difficult for the animal to ingest enough forage material to provide an accelerated weight gain or increased feed efficiency. Another point is that in raising animals for meat purposes—the field with which this invention is particularly concerned—the animals must be fattened on a high-energy diet, that is, corn, barley, milo, or other grains. In such a case, feeding with forage material in large quantities would be completely out of the question as it would reduce the rate of gain by sheer dilution of the diet with low-energy fibrous components. A further factor is that non-ruminant animals (fowls, pigs, etc.) cannot and will not eat any great amount of forage material so that there is no possibility that they could ingest enough of the forage to provide the desired physiological response. Moreover, the estrogenic activity of forages is exceedingly variable and inconsistent. As pointed out by Pieterse et al. (Jour. of Animal Science, vol. 15, pp. 25–36, 1956, at page 34) estrogenic activity in the forage will vary depending on such factors as stage of maturity, climatological and soil conditions, and unknown biochemical changes in the plant after cutting. Also, as reported by these investigators, they could not determine whether a variation in estrogenic activity of alfalfa is due to seasonal changes or the number of previous cuttings of the crop. Another point is that the forage material often contains certain growth inhibition factors. These factors tend to offset the growth promoting effect of the estrogen therein. Further, alfalfa and clovers contain saponins which cause bloat in cattle and sheep. Of the common forages, ladino clover is reported to be the worst in this respect. Under these circumstances, if the animals could be fed enough forage to provide the desired dosage of natural estrogen, the amounts of growth inhibitors and saponin introduced via the forage would cause detrimental effects offsetting any advantage due to the estrogen content of the forage. It is evident from the above that the forage plant material as such is totally unsuitable for providing a controlled physiological response in animals even though this material naturally contains estrogenic principles.

The estrogenic factor in accordance with the invention is completely free from the disadvantages described above in that it is a pure, crystalline compound of high and uniform estrogenic potency. As a consequence it can be administered to animals in controlled dosages to obtain predetermined physiological responses. The problems of low estrogen concentration and variable estrogen concentration as encountered in directly feeding the forage material are completely obviated. Moreover, administration of the estrogenic factor does not involve any physical difficulty of ingestion as with feeding the forage as such because the estrogenic factor can be administered in feeds or other compositions the ingredients of which can be selected to be compatible with the digestive systems or other characteristics of the animals in question. Also the estrogenic factor may be administered by implantation or other techniques which require an active material free from extraneous materials. Another point is that the estrogen factor of the invention is free from growth-inhibiting factors and saponins. Consequently, administration of the estrogenic factor of the invention to animals yields the useful results of attaining a predetermined physiological response without any side effects of causing growth inhibition or bloating. It is thus evident that the product of the invention is useful for purposes for which the forage material as such is not suited. It is moreover to be emphasized that it could not have been predicted that the compound of the invention would exhibit estrogenic activity nor that it would be free from growth-inhibiting or bloat-causing activity. Previous demonstrations of estrogen activity in forages give no clue that the particular compound of this invention is the cause of the estrogenic activity.

The estrogenic factor of the invention may be employed in animal husbandry in the same manner as conventional with diethylstilbestrol and other known estrogenic agents. Thus the estrogenic factor may be administered by incorporating it in conventional feeds, by addition to water or other fluid, by addition to grit fed to birds, by administration in capsules, pellets or by injection, by implantation of pellets, and so forth. The amount of the factor to be administered will of course vary depending on the type of animal, the body weight thereof, the physiological response desired, and the mode of administration. For example where the estrogenic factor is administered in admixture with a feed, dosage of the estrogenic factor may be that equivalent to about from 0.01 to 8 milligrams of diethylstilbestrol per 100 lbs. of body weight per day. Generally it is preferred to administer the estrogenic factor by incorporating it in a conventional feed. Thus the feed may consist mainly of vegetable material such as corn, wheat, barley, milo, hay, dehydrated alfalfa or other forage material, soybean meal, cottonseed meal, distillers grains, peanut meal, oat hulls, bran, corn stalks, corn cobs, sorghum, beet pulp, or the like. For a high-energy diet a major proportion of grain or oil-seed meal is preferred. In addition to the main vegetable portion, the feed may contain the usual supplements such as mineral salts, vitamin preparations, fish meal, fish oil, linseed oil, antibiotic supplements, and so forth. In general the feed may contain on the order of 0.001 to 1 lb. of estrogenic factor per ton of feed. The estrogenic factor may be applied for example to chickens, turkeys, geese, ducks, swine, sheep, cattle, horses, and so forth. Thereby, important practical effects are gained including increased rate of gain and increased efficiency of feed utilization. As noted above, the invention is of particularly practical value as applied to animals, such as steers, which are grown primarily for meat. Thus by application of the teachings of the invention the animals are caused to gain weight more rapidly and produce more flesh per unit weight of feed with resulting economic benefits.

As noted above the estrogenic factor has been isolated in pure crystalline form. The isolated compound has been subjected to scientific investigation and many of its properties have been determined and its complete chemical structure has been determined. The characteristics of the compound are described as follows:

(1) Crystalline solid melting at 385° C.

(2) Exhibits bright blue fluorescence in neutral or acid solution, greenish-yellow fluorescence in strong alkali.

(3) Contains only the elements carbon, hydrogen, and oxygen in substantially these proportions: C, 67.1%; H, 2.98%; O, 29.92% (by difference).

(4) Molecular weight, 268.

(5) Empirical formula, $C_{15}H_8O_5$.

(6) Ultra-violet absorption spectrum in methanol solution: main peak at 343 millimicrons; secondary peak at 243 millimicrons; tertiary peak at 208 millimicrons.

(7) Solubility: The compound is relatively insoluble in water at acid to neutral pH's; sparingly soluble in water at alkaline pH's (pH 11–12); insoluble in petroleum ether; slightly soluble in methanol, chloroform and ether; very slightly soluble in carbon tetrachloride and benzene.

(8) The compound forms by conventional synthesis techniques a diacetate $C_{19}H_{12}O_7$, melting point 237° C. and a dimethyl ether, $C_{17}H_{12}O_5$, melting point 198° C. Formation of these derivatives indicates that the compound has two hydroxyl groups.

(9) Structurally, the compound is 7':6-dihydroxycoumarino (3':4'–3:2) coumarone. For convenience, the compound has been named "coumestrol" by the inventors.

(10) The formula of the compound is:

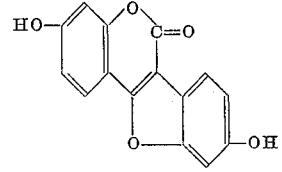

That the compound has the structure designated above was established by the following series of experiments: Reaction of the compound with dimethyl sulphate in methanol-KOH, followed by hydrolysis of the product with 10% methanolic KOH gave 2(2:4-dimethoxyphenyl)-6-methoxy-coumarone-3-carboxylic acid (II). Decarboxylation of II by heating at 240–260° C. yielded 2(2:4-dimethoxyphenyl)-6-methoxy coumarone (III). Ozonolysis of III yielded a primary product 4-methoxy-2-(2:4-dimethoxybenzoyloxy) benzoic acid (IV) and final products 2,4-dimethoxy benzoic acid (V) and 2-hydroxy-4-methoxy benzoic acid (VI). Products IV, V, and VI were identified as such by comparison of their properties with corresponding compounds synthetically produced and of known structure.

The fact that the estrogenic factor of the invention exhibits a high degree of estrogenic activity is indeed surprising considering the fact that it is basically a coumarine derivative and is thus unrelated in chemical structure to the known potent estrogenic materials such as diethylstilbestrol, estrone, etc. A few forage estrogens have been isolated including genistein, daidzein, biochanin-A and formononetin, all having a flavone structure. These substances at best have a low order of activity, about one-fifty thousandths that of diethylstilbestrol. In contrast to these compounds, the factor of the invention is highly potent since its estrogenic activity is about one thousandth that of diethylstilbestrol. It is thus evident that the estrogenic factor of the invention exhibits an activity 50 times as great as that of the known estrogens derived from forages.

The method of isolating the estrogenic factor from forage is demonstrated by the following illustrative example.

*Example*

A. Dehydrated ladino clover (430 lbs.) was covered with enough water to make 400 gallons and the mass was stirred overnight. The next day the mixture was filtered, the filtrate being discarded. The filter cakes were dried, yielding 222 lbs. of dried solid material. This water extraction results in removal from the clover various water-soluble substances including water-soluble saponins.

B. The dried product from step A was extracted with "Skellysolve C" (a petroleum distillate consisting mostly of normal heptane and having the boiling range 190–208° F.) until the extract was no longer colored. A total of about 2000 gallons of solvent was used. In this step the fats, waxes, chlorophyll, carotene, xanthophyll, other carotenoid compounds, and growth-inhibitors were extracted from the clover material. This extract was discarded. In this step, it is not essential to use the solvent described above but one may employ other volatile aliphatic hydrocarbon solvents, for example, hexane or petroleum distillates of the petroleum ether, benzine, naphtha, or gasoline boiling ranges.

C. The solid residue from step B was repeatedly extracted with ether until the extract was no longer colored. A total of about 2000 gallons of ether was employed. The ether-insoluble solid material was discarded. The ether extract was evaporated leaving a solid residue weighing 5 kilos. This residue constitutes a concentrate of the estrogenic factor and may be employed in this form since it exhibits a high degree of estrogenic activity and is essentially free from growth-inhibiting factors and saponins. Regarding the saponins originally present in the clover, the water-soluble saponins are extracted in step A whereas alcohol-soluble saponins remain in the ether-insoluble material left after the ether extraction in this step. Although ether is preferred as the solvent for extracting the active material from the purified clover mass, one may use other fat solvents in which the estrogenic factor is soluble, for example, benzene, chloroform, acetone, and the like.

For further purification of the estrogen factor concentrate the following steps are applied:

D. The concentrate obtained in step C was dissolved in warm chloroform employing 1 liter of the latter per 300 grams of concentrate. This solution was extracted with an aqueous solution of sodium carbonate having a pH of 12 employing 2 liters of carbonate solution per liter of chloroform solution. The resulting aqueous extract was separated, acidified to pH 6–6.5 with hydrochloric acid, then extracted with 5 liters of ether. The ether extract was separated and evaporated leaving 150 grams of product.

In this step, advantage is taken of the fact that the estrogenic factor exhibits weakly acidic properties and in its normal (or lactone) state it is preferentially soluble in organic solvents whereas in its acid (or open-ring) form it is preferentially soluble in water. Thus carrying out of the purification involves a first phase of dissolving the estrogen concentrate in an essentially water-insoluble fat solvent in which the estrogen is soluble, for example, benzene, toluene, xylene, carbon tetrachloride, chloroform, ethylene dichloride, ether, etc. This solution is then extracted with an aqueous solution of alkaline material such as sodium hydroxide, carbonate, tetraborate, etc. to transfer the estrogen to the aqueous phase. This phase is then acidified and extracted with a fat solvent as above exemplified to transfer the estrogen to the organic solvent phase. In these transfers a distinct purification is obtained because compounds which do not exhibit the weakly acidic properties of the estrogen nor its solubility change in acid and alkaline media are eliminated.

E. The product of step D was then subjected to countercurrent distribution in the 100-tube Craig apparatus, employing the solvent systems described below. After distribution in solvent $a$, the estrogenic factor was found to be concentrated in tubes 69 to 90. The material in these tubes was then distributed in solvent $b$ whereby the active material was found to be concentrated in tubes 56–80. The material in these tubes was distributed in solvent $c$ whereby the active material was found to be concentrated in tubes 30–60. The material in these tubes was distributed in solvent $c$ and the active material found to be concentrated in tubes 30 to 60. The material in these tubes was distributed in solvent $d$ and the active material was found to be concentrated in tubes 25–58. The material in these tubes was distributed in solvent $e$ and the active material was found to be concentrated in tubes 40–76. The material in these tubes was finally distributed by a 280-tube transfer in solvent $f$ whereby it was found that the active material was concentrated in tubes 30 to 60. The liquid in these tubes was evaporated leaving a solid material which was recrystallized from methanol-chloroform to yield 2 grams of the pure, crystalline estrogenic factor. This material was subjected to various physical and chemical tests with the results explained hereinabove.

The solvents used in the countercurrent distributions were as follows, the figures referring to parts by volume:

| Ingredient | Solvent system | | | | | |
|---|---|---|---|---|---|---|
| | a | b | c | d | e | f |
| ether | 750 | 0 | 1 | 0 | 0 | 0 |
| "Skellysolve B"[1] | 300 | 0 | 0 | 1 | 0 | 0 |
| acetone | 1,500 | 0 | 0 | 0 | 2 | 20 |
| water | 750 | 2 | 1 | 1 | 1 | 0 |
| chloroform | 0 | 2 | 0 | 0 | 0 | 10 |
| carb. tetrachloride | 0 | 2 | 0 | 1 | 1 | 10 |
| methanol | 0 | 3 | 4 | 1 | 0 | 2 |
| benzene | 0 | 0 | 4 | 0 | 0 | 0 |
| ethyl acetate | 0 | 0 | 0 | 1 | 0 | 0 |

[1] A petroleum distillate consisting essentially of normal hexane and having a boiling range of 146–158° F.

In the course of the isolation process, various fractions were subjected to estrogenic assays to determine the activity of the material as it was rendered increasingly free from impurities. These assays were conducted by feeding female mice with a basal ration containing the fraction to be assayed. A control batch of mice was fed the basal ration as such. After a period of 6 days, all the mice were slain and their uteri were excised and weighed. An increase in uterine weight denotes estrogenic activity in the material under test, the greater the uterine weight over the control, the more potent the material being tested. The basal diet had the following composition:

Ingredient:                                Proportion, percent
    Corn meal _____ 73
    Linseed oil cake meal _____ 10
    Alfalfa meal _____ 2
    Crude casein _____ 10
    Codliver oil _____ 3
    Bone ash _____ 1.5
    Sod. chloride _____ 0.5

In these tests, the mice were fed with the ration ad libitum supplying a definite amount of ration to each animal so that at the end of the test the amount of ration consumed by each animal can be calculated whereby to determine the amount of test material ingested by each animal. Similar tests were made with the basal ration supplemented with diethyl stilbestrol to furnish a standard of comparison.

The results of these estrogenic assays are set forth below wherein the letters A to E refer to the products of the corresponding parts of the above example.

| Material tested | Amount fed, mg. per mouse | Uterine weight, mg. |
|---|---|---|
| Control (basal ration) | | 10 |
| Dehydrated ladino clover | 3,000 | 15 |
| A—residue after water extraction | 3,000 | 27 |
| B—residue after 'Skellysolve' extraction | 3,000 | 65 |
| C—concentrate from ether extraction | 200 | 36 |
| D—residue from second ether extract | 15 | 95 |
| E—final product | 0.67 | 95 |
| E—final product | 1.70 | 130 |
| Diethyl stilbestrol | 0.0004 | 72 |

An alternative method for isolating the estrogenic factor of the invention involves the following procedure: The forage material is extracted with an aqueous solution of alkaline material such as sodium carbonate, sodium hydroxide, ammonium hydroxide, potassium carbonate of hydroxide, borax, or the like. The extraction is preferably performed at room temperature or less to avoid decomposition of the estrogen. For like reason the solution should not have a pH above 10 to 11. An excess of the alkaline solution is employed to ensure dissolving all the estrogen from the forage. The resulting solution containing the estrogen is separated from the forage material and acidified to about pH 6–6.5 with hydrochloric, sulphuric, phosphoric, acetic, or other acid. The acidified aqueous solution is then extracted with an essentially water-insoluble fat solvent such as chloroform, benzene, toluene, xylene, carbon tetrachloride, ethylene dichloride, or ether, the latter being preferred. In this operation the estrogenic factor is transferred to the organic solvent phase. This phase is separated from the aqueous phase, reduced to dryness and the dry residue is subjected to molecular distillation whereby the estrogenic factor can be readily separated from the remaining impurities since it will sublime at about 325° C. at atmospheric pressure or at 175° C. under vacuum (about 7 microns pressure). The sublimed material on recrystallization from methanol or methanol-chloroform yields the pure, crystalline estrogenic factor.

Having thus described the invention what is claimed is:

1. Pure, crystalline 7':6-dihydroxycoumarino (3':4-3:2) coumarone.

2. An animal feeding composition comprising a major proportion of a non-toxic, ingestible carrier material and a minor but physiologically adequate proportion of the compound 7':6-dihydroxycoumarino (3':4'-3:2) coumarone.

3. An animal feed comprising a major proportion of edible vegetable material and a minor but physiologically adequate proportion of the compound 7':6-dihydroxycoumarino (3':4'-3:2) coumarone.

4. An animal feed comprising a major proportion of edible vegetable material, selected from the group consisting of grain, oil-seed meal, and mixtures thereof, and a minor but physiologically adequate proportion of the compound 7':6-dihydroxycoumarino (3':4'-3:2) coumarone.

5. An animal feed comprising a major proportion of edible vegetable material and a minor but physiologically adequate proportion of added 7':6-dihydroxycoumarino (3':4'-3:2) coumarone, the concentration of the latter being substantially higher than naturally present in said vegetable material alone.

6. A method of increasing the dietary value of an animal feeding preparation containing mainly non-toxic, ingestible carrier material which comprises adding to the preparation a physiologically adequate amount of the compound 7':6-dihydroxycoumarino (3':4'-3:2) coumarone.

7. A method of increasing the dietary value of an animal feed containing mainly vegetable material which comprises adding to the feed a physiologically adequate amount of the compound 7':6-dihydroxycoumarino (3':4'-3:2) coumarone.

8. A method of isolating an estrogenic factor from plant material selected from the genera Medicago and Trifolium which comprises extracting the material with water to remove water-soluble materials including saponins, extracting the residual material with a volatile aliphatic hydrocarbon solvent to remove fats, waxes, and growth-inhibiting substances, extracting the residual material with ether and evaporating ether from the resulting extract whereby to prepare an estrogenic factor concentrate containing the compound 7':6-dihydroxycoumarino (3':4'-3:2) coumarone.

9. A method of isolating an estrogenic factor from ladino clover which comprises extracting the clover with water to remove water-soluble materials including saponins, extracting the residual material with a volatile aliphatic hydrocarbon solvent to remove fats, waxes, and growth-inhibiting substances, extracting the residual material with ether, evaporating ether from the resulting ether extract to leave as a residue an estrogenic factor concentrate, dissolving this concentrate in a chlorinated aliphatic hydrocarbon solvent, subjecting this solution to extraction with an aqueous alkaline solution, acidifying the resulting aqueous extract and extracting it with ether and evaporating ether from the resulting ether extract to produce a purified estrogenic factor concentrate containing the compound 7':6-dihydroxycoumarino (3':4'-3:2) coumarone.

10. The process of claim 9 wherein the purified estrogenic factor concentrate is subjected to countercurrent distribution to obtain the estrogenic factor in pure crystalline form.

11. A method of isolating an estrogenic factor from plant material selected from the genera Medicago and Trifolium, which comprises extracting the plant material with an aqueous alkali solution having a pH not above 11, separating the aqueous alkaline extract from residual plant material, acidifying the said extract and extracting it with an essentially water-insoluble, volatile, organic fat-solvent, separating the solvent phase from the aqueous phase, reducing the solvent phase to dryness and separating therefrom by sublimation the compound 7':6-dihydroxy-coumarino (3':4'-3:2) coumarone.

References Cited in the file of this patent

UNITED STATES PATENTS

| 2,427,579 | Stahmann | Sept. 16, 1947 |
| 2,589,898 | Turner | Mar. 18, 1952 |
| 2,751,303 | Burroughs | June 19, 1956 |

OTHER REFERENCES

Chem. Abst., 45 (1951), 9148a, abstracted from Dohan et al.: J. Am. Vet. Med. Assoc., 118 (1951), 323–4.

Chem. Abst., 46 (1952), 2756i.